Patented May 21, 1946

2,400,577

UNITED STATES PATENT OFFICE 2,400,577

ALIPHATIC ESTERS OF PHENYL-PHOSPHONIC ACID

Arthur Dock Fon Toy, Chicago, Ill., assignor to Victor Chemical Works, a corporation of Illinois No Drawing. Application January 10, 1944,
Serial No. 517,705

4 Claims. (Cl. 260—461)

This invention relates to aliphatic esters of phenylphosphonic acid and a method for producing them.

It relates particularly to the reaction of phenyl phosphorus oxydichloride with alcohols and monohydroxy ethers to produce di esters of phenylphosphonic acid, and particularly those containing more than two carbon atoms in the alkyl group.

Under normal conditions the reaction of phenyl phosphorus oxydichloride with alcohols yields various decomposition products and does not produce phosphonic acid esters, but I have discovered that, if the reaction is carried out under vacuum and is carefully controlled by the use of positive cooling means and the maintenance of a temperature not substantially over 30° C., an almost quantitative yield of phosphonate esters may be obtained. As is set forth in the examples hereinafter described, yields of over 80% and even over 90% are common when employing my method.

The normal action of phenyl phosphorus oxydichloride with alcohols or with hydroxy ethers is highly exothermic. Under my controlled conditions the reaction proceeds in accordance with the following equation in the case of alcohols:

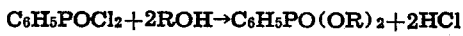

$$C_6H_5POCl_2 + 2ROH \rightarrow C_6H_5PO(OR)_2 + 2HCl$$

In order to prevent decomposition of the esters by hydrogen chloride, the reaction is carried out at a temperature below 30° C. The temperature control is accomplished by positive cooling means such as cooling coils or baths. The use of vacuum is necessary to remove gaseous hydrogen chloride as it is formed by the reaction. It is also preferred to employ an excess of alcohol to facilitate completion of the reaction. The excess alcohol may be recovered and used again in the next batch.

The extent of the vacuum employed is determined to a large extent by the nature of the reaction and the reacting ingredients, and is always high enough to maintain the temperature at the proper low point. Normally an absolute pressure of less than 30 mm. of mercury is employed.

As a typical example of the process, 58.5 parts by weight of phenyl phosphorus oxydichloride was slowly added to 163.2 parts of normal butyl alcohol in a reaction vessel under vacuum equal to about 20 mm. of mercury absolute pressure while maintaining the temperature at less than 30° C. until about 85% to 95% of the liberated hydrogen chloride is removed. The temperature was then gradually increased until all of the liberated HCl is removed. The excess alcohol is then distilled over and collected, and finally the dibutyl phenylphosphonate, boiling at 166° C. (4 mm. pressure), is distilled over and recovered. An 87.6% yield of the pure ester was obtained as a water clear, water-insoluble liquid.

In a similar procedure phenyl phosphorus oxydichloride was reacted with 2-ethyl hexanol (octyl alcohol) to give a 93.5% yield of dioctyl phenylphosphonate having a boiling point of 204–207° C. at 4 mm. pressure.

Butoxyethanol (glycol monobutyl ether) was used as the alcohol reactant in a further example. A 92.5% yield of dibutoxyethyl phenylphosphonate, boiling at 207–210° C. (4 mm. pressure) was obtained.

In another example ethoxyethanol (glycol monoethyl ether) was reacted with the phenyl phosphorus oxydichloride to give a yield of 87.2% of diethoxyethyl phenylphosphonate which boils at 220° C. at 17 mm. pressure. The product was a slightly water-soluble, water clear, oily liquid.

In another example a 95% yield of di-n-amyl phenylphosphonate was obtained. This ester had a boiling point of 170° C. at 5 mm. pressure.

The dimethyl, ethyl, and propyl esters have also been produced by the process in yields ranging from 75% to 90%. Because of the relatively low boiling points of the lower alcohols, it is necessary to maintain an even lower reaction temperature. It is preferred that these temperatures be less than about 20° C. for best results.

We have indicated that the diester products of the process are recovered by distillation. This is preferred where the esters may be distilled without thermal decomposition, but in some cases it may be desirable to simply distill off the excess alcoholic reagent and wash or otherwise purify the residual crude diester product.

Both the dialkyl esters and dialkoxyalkyl esters of phenylphosphonic acid are high boiling stable compounds, and are suitable for use as plasticizing agents and as addition agents for lubricating oils, etc.

Aralkyl and aryloxyalkyl esters of the general formulas

and

may be considered as within the scope of the present invention.

The cycloalkyl esters such as may be obtained by the reaction of cyclohexanol, etc. with the phenyl phosphorus oxydichloride may also be used. As an example of this type, 58.5 parts of $C_6H_5POCl_2$ and 180 parts (by weight) of cyclohexanol were reacted at 25-30° C. for 16 hours under vacuum until most of the hydrogen chloride formed had been removed. The temperature was then raised to about 80° C. to remove the last traces of hydrogen chloride; a 93% yield of a crude ester product was obtained. Some decomposition took place when trying to distill this crude product under vacuum.

In another example the crude ester product was washed with dilute caustic soda solution and the water-insoluble liquid separated. A yield of approximately 80% of a substantially pure dicyclohexyl phenylphosphonate was obtained. It analyzed 9.72% phosphorus as compared to 9.63%, the theoretical value.

The foregoing detailed description has been given for clearness of understanding only, and no unnecessary limitations should be understood therefrom.

What I claim as new, and desire to secure by Letters Patent, is:

1. As new compounds, the diesters of phenylphosphonic acid having the general formula

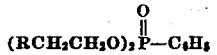

where R represents an alkoxy group.

2. Dibutoxyethyl phenylphosphonate having a boiling point of approximately 207-210° C. at 4 mm. pressure.

3. Diethoxyethyl phenylphosphonate having a boiling point of approximately 220° C. at 17 mm. pressure.

4. The new compounds dialkoxyalkyl phenylphosphonates.

ARTHUR DOCK FON TOY.